United States Patent

Naberhuis et al.

Patent Number: 5,309,304
Date of Patent: May 3, 1994

[54] MAGNETORESISTIVE TRANSDUCER CONDUCTOR CONFIGURATION

[75] Inventors: Steven L. Naberhuis, Fremont, Calif.; Ralph Simmons, Boise; Robert J. Davidson, Eagle, both of Id.; Victor W. Hesterman, Los Altos, Calif.; Lung T. Tran, Saratoga, Calif.; Giora J. Tarnopolsky, Palo Alto, Calif.

[73] Assignee: Hewlett-Packard Company, Palo Alto, Calif.

[21] Appl. No.: 894,394

[22] Filed: Jun. 5, 1992

[51] Int. Cl.⁵ .............................. G11B 5/127
[52] U.S. Cl. ........................ 360/113; 360/126
[58] Field of Search ........... 360/110, 113, 119, 122, 360/126

[56] References Cited

U.S. PATENT DOCUMENTS

| | | | |
|---|---|---|---|
| 3,860,965 | 1/1975 | Voegeli | 360/113 |
| 4,012,781 | 3/1977 | Lin | 360/113 |
| 4,438,470 | 3/1984 | Sawada et al. | 360/113 |
| 4,556,925 | 12/1985 | Suenaga | 360/113 |
| 5,193,038 | 3/1993 | Smith | 360/113 |

FOREIGN PATENT DOCUMENTS 187912 7/1990 Japan ........................ 360/113

Primary Examiner—Louis J. Casaregola

[57] ABSTRACT

In a magnetoresistive transducer, a conductor configuration in which magnetic fields in the conductors are oriented in the same direction to provide symmetric track profiles and improved track edge response. Conductor area at the transducer air bearing surface is also minimized to eliminate shorting and improve device yield and reliability. In one embodiment of the invention, inductive pickup is minimized by limiting the active width of magnetoresistive sensing elements through conductor placement. Another embodiment of the invention, useful for applications involving dual stripe magnetoresistive transducers, minimizes inductive pickup by providing relatively large conductors for each magnetoresistive stripe, arranged in parallel with each other and coupled differentially to cancel inductive pickup through common mode rejection.

3 Claims, 3 Drawing Sheets

*Figure 1a* (PRIOR ART)
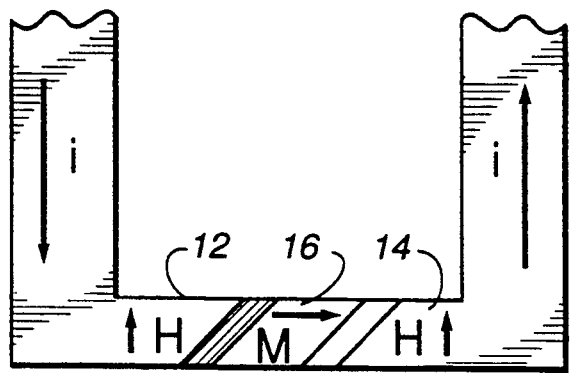
*Figure 1b* (PRIOR ART)
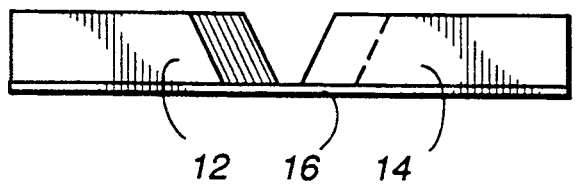
*Figure 2a* (PRIOR ART)
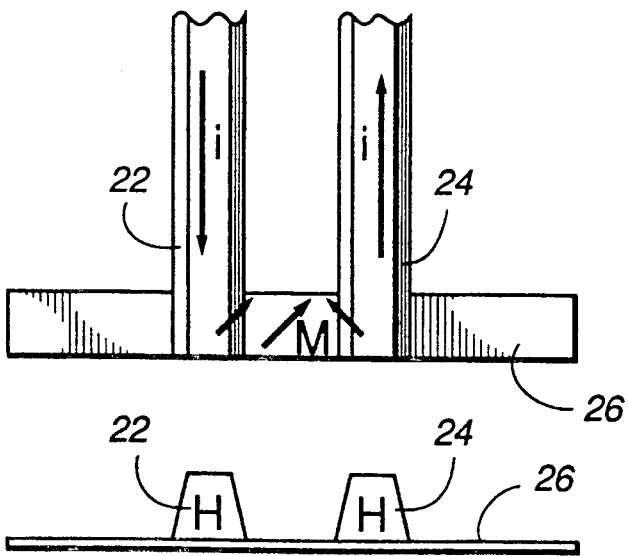
*Figure 2b* (PRIOR ART)

Figure 3a
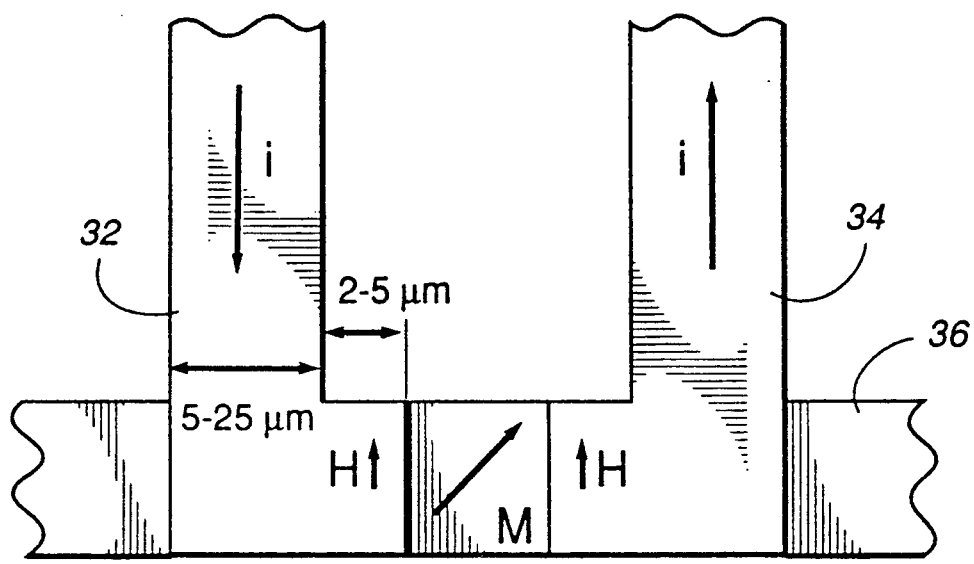
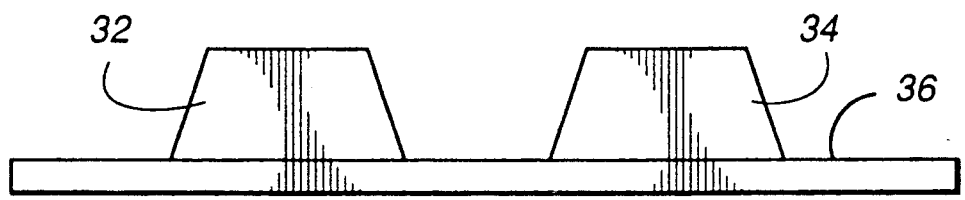
Figure 3b
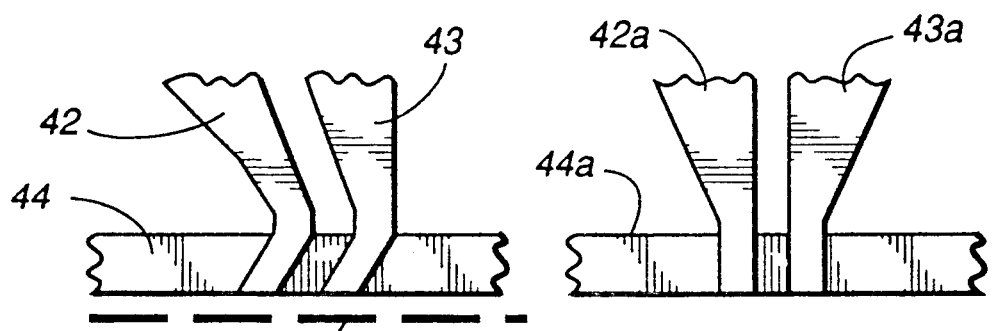
Figure 4a    Figure 4b

MAGNETORESISTIVE TRANSDUCER CONDUCTOR CONFIGURATION

BACKGROUND OF THE INVENTION

1. TECHNICAL FIELD

The present invention relates to magnetoresistive transducers. More particularly, the present invention relates to improvements in conductor configurations for magnetoresistive transducers.

2. DESCRIPTION OF THE PRIOR ART

Continuing advances in magnetic media technology allow increasing data storage densities. One active area of development is that of reading transducers of high output. As such transducers are made smaller, data densities are increased. Magnetoresistive (MR) thin film technology has provided a particularly promising area of inquiry with regard to producing smaller reading transducers. In such technology, conductive thin films are formed on a substrate using techniques analogous to those of the semiconductor arts.

The MR stripe or element in a single stripe MR transducer (or the two MR stripes or elements is a dual stripe MR transducer, such as is described in U.S. Pat. No. 3,860,965, issued to Voegeli), must be long with respect to a magnetic medium track width. In this way, the transducer presents a stable domain state. Various configurations have been proposed for contacting the MR stripe to provide a source of current to the stripe and to sense flux (i.e. data) with the MR stripe arrangement.

One such conductor arrangement from prior art, shown in FIGS. 1a and 1b, provides two conductors 12,14 for contacting each MR stripe 16. In the Fig. current directions are indicated by the designation 'i', magnetic field directions by the designation 'H', and magnetization directions by the designation 'M'. These conventions shall be applied throughout the present application.

The arrangement shown, referred to as a conductors-over arrangement because the conductors are arranged above an MR stripe, is used in barber-pole biased MR heads. The conductors-over arrangement is prone to shorting either to the transducer shields (not shown) or to the other MR stripe (in a dual stripe MR transducer). Such shorting is due to conductor smearing during the lapping process used to form the transducer air bearing surface, or as a consequence of encountering an asperity on the surface of a disk in an operating disk drive.

The length of the conductor along the transducer air bearing surface is of critical importance. The length of the conductor in FIG. 1a can be as much as 400 μm and as little as 40 μm. The longer this dimension, the more likely a short can occur between transducer shields (not shown) and the MR conductors, or between the two MR conductors in a dual stripe transducer, as a consequence of lapping the transducer air bearing surface, or as a consequence of contacting disk asperities as previously described.

Another arrangement discussed in the prior art, shown in FIGS. 2a and 2b, is referred to, appropriately, as a tip arrangement. A tip transducer includes conductors 21,22 arranged to carry current to and from an MR element 26. It is generally acknowledged that this arrangement was developed by International Business Machines of Armonk, N.Y. It has been the experience of those working with transducers having a tip arrangement that such configuration leads to unequal track edge response, in part because of the way magnetic fields 'H' are imposed in different directions at the conductor (track edge) edges due to the electrical current 'i'.

In FIG. 2a, the directions of the magnetic fields 'H' induced by the currents 'i' are not equivalent, even if the current does not bend as assumed at the track edges. Thus, the magnetization 'M' is rotated unequally at the track edges. Accordingly, different responses occur at the track edges and, as a result, track profiles become asymmetric.

The length of the MR element (or elements in a dual stripe transducer configuration) must also be significantly larger than the track width to achieve high track density reproduction with a single domain MR transducer. One practice is to place the MR sensor portion of an MR transducer between two magnetic shields to obtain high resolution along the track. In an MR read element, the active area is defined as the area in which sense current flows in the MR element and typically results from the placement of the conductor leads which carry current to and from the MR element. The leads and MR element in combination constitute a single turn coil which gives rise to an undesirable inductive response to recorded information. The magnitude of this response is determined by the number of tracks over which such coil extends.

Thus, the state of MR transducer art presents a technology that suffers from various problems associated with conductor arrangement, including low yields due to shorting, poor symmetry in track profiles due to a lack if uniform fields at the track edges, and inductive pickup which results in intertrack interference.

SUMMARY OF THE INVENTION

The present invention provides an improved arrangement for current carrying conductors in a magnetoresistive transducer such that the problems of shorting, lack of symmetry in track edges, and inductive pickup are minimized, if not eliminated.

In the preferred embodiment of the invention, a conductor arrangement is provided for either single or dual stripe transducers in which magnetic fields in the conductors are oriented in the same direction to provide symmetric track profiles and thus improved track edge response. Conductor area at the air bearing surface is also minimized to mitigate shorting and thus improve device yield and reliability.

In one embodiment of the invention, inductive pickup is minimized by limiting the active width of magnetoresistive sensing elements through conductor placement. Another embodiment of the invention, useful for applications involving dual stripe magnetoresistive transducers, minimizes inductive pickup by providing coincidentally arranged conductors for each magnetoresistive stripe, which are coupled differentially to cancel inductive pickup through common mode rejection.

BRIEF DESCRIPTION OF THE DRAWINGS

FIG. 1a is a plan view of a conductors-over conductor arrangement according to the prior art;

FIG. 1b is an air bearing surface view of a conductors-over conductor arrangement according to the prior art;

FIG. 2a is a plan view of a tip conductor arrangement according to the prior art;

FIG. 2b is an air bearing surface view of a tip conductor arrangement according to the prior art;

FIG. 3a is a plan view of a conductor arrangement according to the present invention;

FIG. 3b is an air bearing surface view of a conductor arrangement according to the present invention;

FIG. 4a is a plan view of a conductor arrangement for a barber pole magnetoresistive sensor according to the present invention;

FIG. 4b is a plan view of a conductor arrangement for a SAL-biased magnetoresistive transducer according to the present invention;

DETAILED DESCRIPTION OF THE INVENTION

Figure 4C:
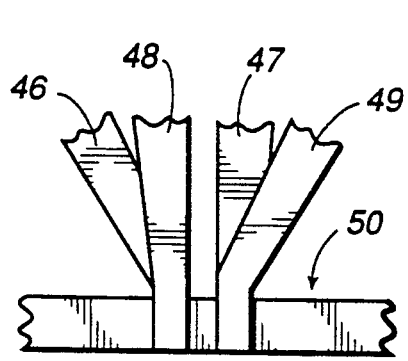
FIG. 4c is a plan view of a coincident conductor arrangement having application in dual stripe magnetoresistive transducers according to the present invention.

The present invention is best understood by referring to the Drawings in connection with review of this Description. The present invention provides a unique conductor configuration for a magnetoresistive (MR) transducer. By application of the teachings of the present invention, it is possible to produce various types of MR transducer, all exhibiting the properties of symmetric track profiles, immunity to inductive pickup, and low likelihood of shorting due to smearing during the lapping process.

An MR transducer configuration is shown in FIGS. 3a and 3b in which conductors 32,34 are arranged to contact an MR element 36 for carrying current to and from the MR element. The conductors are provided in a general L-shaped configuration with the wider portion of the 'L' contacting the MR element. The conductors shown in the Fig. have a preferred conductor width of from 5 $\mu$m to 25 $\mu$m at a conductor portion leading to the MR element and a width of from 2 $\mu$m to 5 $\mu$m at a conductor portion overlaying the MR element.

Current flow in the conductors 'i' is shown by arrows in the Fig. Thus, current is brought to the MR element by the conductor 32 and is taken from the MR element by the conductor 34 and uniform current injection into the MR elements is effected. As is shown in the Fig., an important property of the present invention is that the magnetic fields 'H' in the conductors run in the same direction due to the current in the conductors at each track edge. In this way, the invention provides uniform magnetic fields at the track edges. This is important in maintaining a symmetric track profile, without having a negative effect on track edge response. Magnetization 'M' is indicated as a diagonal across the transducer active area.

FIG. 3b shows a transducer air bearing surface view of the present invention in which the conductors 32,34 have a narrow, tapered profile. It is significant to note that this narrow profile presents a minimal conductor surface to the air bearing surface of the transducer. Thus, when the transducer is lapped to create the air bearing surface, it is less likely that the conductor will smear and short to other transducer structures. Additionally, the small area presented by conductors fabricated in accordance with the present invention minimizes inductive pickup, as discussed at greater length below. It is important to note that the foregoing discussion has been with regard to a conductors-over transducer configuration in which magnetization direction is shown in a biased state. The invention is not limited to the exemplary embodiment discussed above and it is contemplated that conductors under the MR elements, as well as other types of elements may be provided in practicing the invention. Additionally, the invention is not dependent upon the method used for biasing the MR element. This arrangement can also be used in dual stripe MR transducers.

Another aspect of the present invention is the provision of an electrical contact to an MR transducer (or other solid state sensor., such as an Hall effect device) in which inductive pickup due to the single turn coil nature of the sensing element (MR element) and its electrical leads is minimized. In the case of differential sensors, such as a dual element MR sensor, the present invention provides a means for eliminating inductive pickup and significantly reducing intertrack interference.

FIGS. 4a-4d are plane views that relate examples of conductor arrangements according to the present invention when applied to various MR transducer configurations. FIG. 4a shows a conductor configuration for a barber-pole type MR sensor structure in which conductors 42,43 contact an MR element 44. Tracks on a magnetic medium are positioned as indicated by the line 45 in which the solid portions of the line indicate the tracks, with separation between the tracks indicated by breaks in the line. Track positions relative to the active area of the transducer as shown in FIG. 4a are consistent with those for subsequent FIGS. 4b-4c, but are only shown in FIG. 4a for the sake of simplicity.

In the configuration of FIG. 4a, inductive pickup is minimized by minimizing the active width of the sensors through placement of the conductors in a closely spaced relationship, one to the other. Thus, when the sensor is over one track, there is virtually no sensitivity to the adjacent tracks for either an MR response or an inductive response.

FIG. 4b shows conductors 42a,43a arranged to contact an MR element 44a. The arrangement shown finds application in soft adjacent layer (SAL-biased) MR transducers. Operation of the embodiment of FIG. 4b is the same as for that of FIG. 4a. Thus, the conductors are spaced to confine an active region to a chosen track and thus minimize inductive pickup.

FIG. 4c shows a conductor arrangement useful in dual stripe MR transducers. A first pair of conductors 46,47 contacts a first of a pair of MR elements 50 and a second pair of conductors 48,49 is arranged to contact a second of a pair of MR elements. In this configuration, the MR elements are coincident, i.e. one element is arranged over the other element. The configuration of FIG. 4c places the conductor pairs close together to limit the active region of the sense element. Additionally, a differential output is developed by sensing with each sense element and, when the differential signals are combined, inductive pickup is cancelled through common mode rejection. Such differential sensing is valid for dual stripe MR transducers (see, for example, U.S. Pat. No. 3,860,965, issued to Voegeli). It is significant that the differential signals will only cancel if each MR stripe exhibits similar properties, i.e. they encompass the same area, both in extent and in position.

Figure 4D:
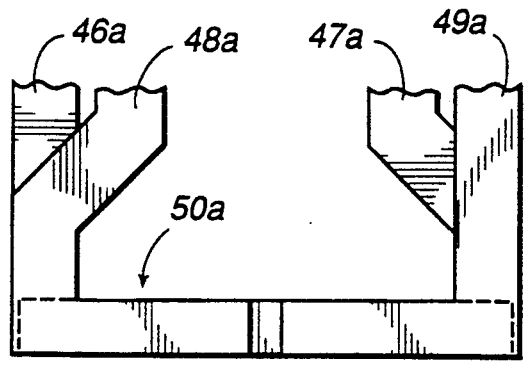
FIG. 4d is a plan view of another coincident conductor arrangement having application in dual stripe magnetoresistive transducers according to the present invention.

The configuration shown in FIG. 4d provides another embodiment of the present invention in which a dual stripe MR transducer includes two conductor pairs 46a/47a, 48a/49a connected to a pair of MR sense elements 50a. In this embodiment of the invention, the MR elements are coincident with each other, as with the embodiment of FIG. 4c, but inductive pickup from each MR element is relatively large because the magnetic fields from many tracks are sensed. However, the magnetic fields are sensed in combination by the MR elements with the two element signals subtracted from each other when connected differentially. Thus, the net inductive pickup is nearly zero because the conductor patterns encompass virtually the same area in extent and position relative to the tracks. Thus, as long as the conductivities of the conductor leads are at least ten times those of the MR elements to which the conductors are connected, the responses of the MR elements are largely confined to the track over which the sensor is centered.

Figure 5A:
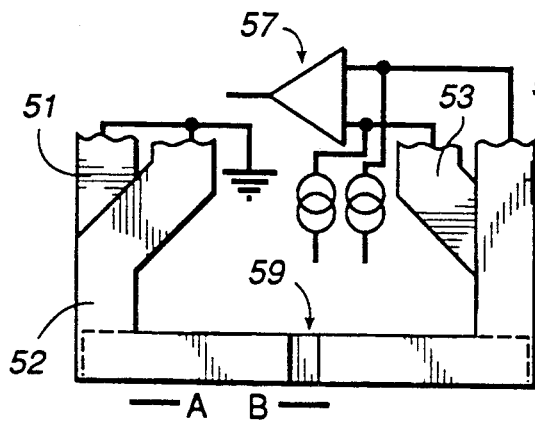
FIG. 5a is a conductor arrangement for a dual stripe magnetoresistive transducer in which single turn coils are coincident according to the present invention.
Figure 5B:
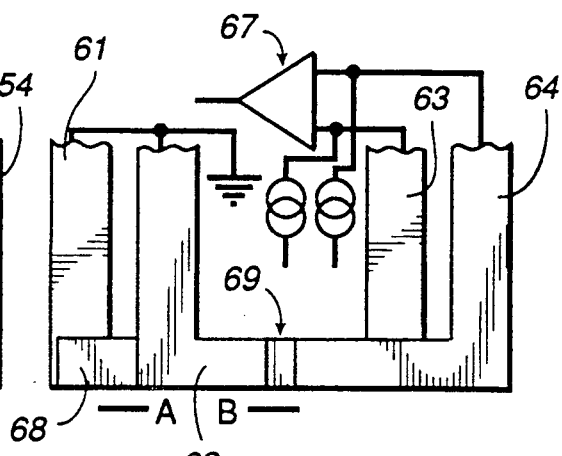
FIG. 5b is a conductor arrangement for a dual stripe magnetoresistive transducer in which single turn coils having the same area are offset, for example.
Figure 5C:
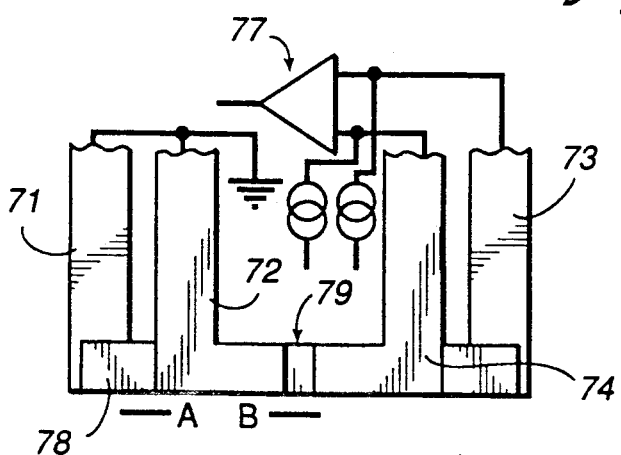
FIG. 5c is a conductor arrangement for a dual stripe magnetoresistive transducer in which single turn coils having different areas are not coincident, for example.

FIGS. 5a-5c provide examples of dual stripe MR transducers having the outputs of the MR elements connected differentially and having an active region centered over a first track 'B', with an adjacent track 'A' positioned along one conductor of the transducer. The example of FIG. 5a depicts one embodiment of the present invention in operation. In all three examples the MR active regions are the same with no MR element offsets.

FIG. 5a shows a preferred embodiment of the present invention having a first conductor pair 51,53 and a second conductor pair 52,54 connected between two MR elements (not shown) and a differential amplifier 57. An active region 59 of the transducer is shown centered on track 'B'. In the Fig. the single turn coils composed of the conductor/MR element combinations have the same area and are coincident. In operation, this configuration exhibits high MR response reading data on track 'B', while inductive response is cancelled. Additionally, this configuration renders no MR or inductive response for track 'A'.

FIG. 5b shows a first conductor pair 61,63 and a second conductor pair 62,64 connected between two MR elements 68 and a differential amplifier 67. An active region 69 of the transducer is shown centered on track 'B'. In the Fig. the single turn coils composed of the conductor/MR element combinations have the same area but are not coincident. In operation, this configuration exhibits high MR response reading on track 'B' while inductive response from 'B' is cancelled. Additionally, this configuration renders no MR response for track 'A'. The configuration renders a finite inductive response for track 'A' since flux threads the coil formed by the first MR element and its associated conductor leads, while little or no flux threads the coil formed by the second MR conductor and its associated conductor leads. This configuration gives rise to nonrepeatable inductive pickup.

FIG. 5c shows a first conductor pair 71,73 and a second conductor pair 72,74 connected between two MR elements 78 and a differential amplifier 77. An active region 79 of the transducer is shown centered on track 'B'. In the Fig. the single turn coils composed of the conductor/MR element combinations have different areas and are not offset. In operation, this configuration exhibits high MR response reading data on track 'B', while inductive response from 'B' is cancelled. The configuration renders a finite inductive response for track 'A' since flux threads the coil formed by the first MR element and its associated conductor leads, while little or no flux threads the coil formed by the second MR conductor and its associated conductor leads. This configuration also gives rise to non-repeatable inductive pickup.

The examples given and discussed above with regard to FIGS. 5b and 5c are provided as illustrations of two conductor configurations that are not acceptable in that inductive pickup is not limited. Thus, these configurations do not meet the criteria of the present invention, i.e. reduction or elimination or inductive pickup. Generally, one preferred embodiment of the invention is that set forth in FIG. 5a, as discussed above. Specifically, for dual stripe MR transducers, the preferred embodiment of the invention employs the conductors shown in FIG. 3a in the configuration indicated in FIG. 4d.

Although the invention is described herein with reference to the preferred embodiment, one skilled in the art will readily appreciate that other arrangements and applications may be substituted for those set forth herein without departing from the spirit and scope of the present invention. Accordingly, the invention should only be limited by the claims included below.

We claim:

1. A magnetoresistive transducer having an air bearing surface, said transducer comprising:

at least one magnetoresistive element;

a first conductor for carrying current to said magnetoresistive element; and a second conductor for carrying current from said magnetoresistive element;

wherein each of said conductors has a tapered configuration when viewed from said air bearing surface, and an L-shaped configuration when viewed from above with the wider bottom portion of the "L" contacting the magnetoresistive element; said conductors arranged in a closely spaced configuration encompassing a minimal area necessary to confine a transducer active area to a defined track region; said conductors having a preferred conductor width of from 5 μm to 25 μm at a conductor portion leading to the magnetoresistive element, and having an additional width of from 2 μm to 5 μm at said wider portion of said "L" shaped conductor.

2. The magnetoresistive transducer of claim 1, further comprising:

at least two magnetoresistive elements; and a conductor pair associated with each magnetoresistive element for carrying current to and from said magnetoresistive elements, wherein said conductor pairs are arranged coincident to each other.

3. The magnetoresistive transducer of claim 1, wherein at least two L-shaped conductors, one conductor from each conductor pair, are arranged in a mirrored "L" configuration about the axis parallel to the long part of the "L".

* * * * *